United States Patent [19]

Rollband

[11] Patent Number: 4,787,307
[45] Date of Patent: Nov. 29, 1988

[54] NUTCRACKER

[76] Inventor: Ernest J. Rollband, 3415 Slaterville Rd., Brooktondale, N.Y. 14817

[21] Appl. No.: 141,002

[22] Filed: Jan. 5, 1988

[51] Int. Cl.⁴ ............................................. A23N 5/00
[52] U.S. Cl. ....................................... 99/572; 99/579; 99/582
[58] Field of Search .......... 99/568, 572, 573, 579–583; 30/120.1, 120.2, 120.5

[56] References Cited

U.S. PATENT DOCUMENTS

| | | |
|---|---|---|
| 2,740,439 | 4/1956 | Dillard . |
| 2,827,087 | 3/1958 | Connor . |
| 3,159,194 | 12/1964 | Anderson . |
| 3,311,143 | 3/1967 | Vetter . |
| 3,578,047 | 5/1971 | Diggs . |
| 3,713,468 | 1/1973 | Walsh . |
| 4,255,855 | 3/1981 | Brazil ................................. 30/120.5 |
| 4,377,970 | 3/1983 | Kenkel . |
| 4,466,343 | 8/1984 | Thompson . |
| 4,520,719 | 6/1985 | Price . |

*Primary Examiner*—Timothy F. Simone
*Attorney, Agent, or Firm*—Ralph R. Barnard

[57] ABSTRACT

A nutcracker, mounted on a base, grips a nut to be cracked between a movable piston and an adjustable anvil. The user sets the optimum cracking distance initially by lining up an index marker located on the piston and adjusting the anvil to firmly hold the opposite end of the nut. Thereafter, the user need only move the lever handle to its up position and insert the nut—no further adjustment of the anvil is necessary for similar sized nuts. The user then moves the piston a limited distance by activating the lever handle connected to the piston through a toggle joint, or by some other limited-movement arrangement. This limited movement enables the inventive nutcracker to crack the nutshell without damaging the meat inside.

6 Claims, 1 Drawing Sheet

NUTCRACKER

BACKGROUND OF THE INVENTION

The invention relates to apparatus for treating food by separation of the outer portion. More specifically, the invention relates to apparatus for removing the shells from nuts, especially "table nuts" such as pecans, filberts, and Brazil nuts.

This invention is an alternative model to my previous nutcracker disclosed in U.S. Pat. No. 4,370,922, issued in 1983. The present model is cheaper and easier to manufacture than the previous model because the adjustment for nut size is manual in the former, rather than automatic as in the latter. However, they are similar in that the same toggle concept is used in both to obtain the maximum cracking force without over cracking the nut.

The nutcracker, as such, has long been known, of course. Many types are on the market, ranging from the familiar hand nutcracker to elaborate electrical contrivances. There is, however, still a need for a simple, efficient, home nutcracker which can be used when a large quantity of nuts must be cracked, for example in cooking.

In the case of nuts such as pecans, or other similar nuts, it is important to be able to crack the shell of the nut without damaging the meat inside, which is prone to break if the nut is "over cracked". When the nut meats are to be used in cooking, and thus are needed in quantity, much time can be lost in picking pieces of shell apart from the broken nutmeat. Small pieces can be lost or wasted. Thus, it is an object of this invention to provide a nutcracker which can crack the shells of nuts with minimal damage to the meat.

The fact that nuts vary considerably in size aggravates the problem of accurate cracking. If the nutcracker must be readjusted for each nut, much time will be wasted. Moreover, mis-adjustment will result in broken nutmeat, and thus waste. It is, therefore, an additional object of the present invention to provide a nutcracker which may initially be set for nut size with the aid of an index marker, such that further adjustment is not necessary for nuts which are similar in size.

It is another object to provide a nutcracker which is easy and inexpensive to manufacture, yet rugged and long-lasting in operation.

It is yet another object of the present invention is to provide a nutcracker which is fast to operate, while still being safe to use.

It is still another object of the present invention to provide a nutcracker which is easy to use, fast, and efficient.

Other objects and advantages of the invention will become apparent upon further examination of this disclosure.

SUMMARY OF THE INVENTION

The present invention is a simple, safe, and efficient nutcracker which is especially adapted to cracking the shells of nuts such as pecans without damaging the nutmeat.

The nutcracker disclosed herein grips the nut between a movable piston and an adjustable anvil. The user sets the optimum cracking distance initially by lining up an index marker located on the piston and adjusting the anvil to firmly hold the opposite end of the nut. Thereafter, the user need only move the lever handle to its up position and insert the nut—no further adjustment of the anvil is necessary for similar sized nuts. The user then moves the piston a limited distance by activating the lever handle connected to the piston through a toggle joint, or by some other limited-movement arrangement. This limited movement enables the inventive nutcracker to crack the nutshell withou harming the meat inside.

BRIEF DESCRIPTION OF THE DRAWINGS

FIG. I shows the invention in an inoperative position with the lever handle in a down position.

FIG. II shows the invention with a nut positioned to be cracked.

FIG. III shows a top view of the invention with the lever handle in an up position.

DESCRIPTION OF THE PREFERRED EMBODIMENT

In each figure the reference numbers are the same, thus each number will always refer to the same part.

Figure 1:
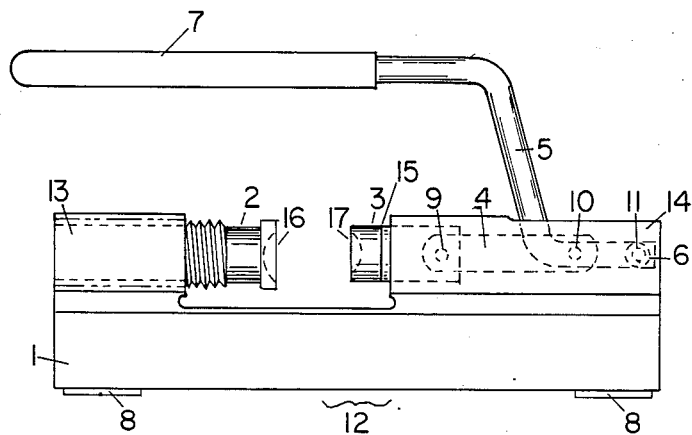
Figure 2:
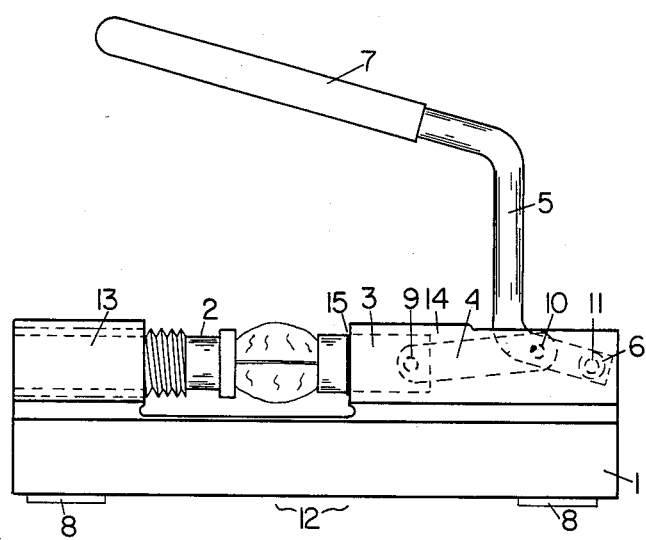
Figure 3:
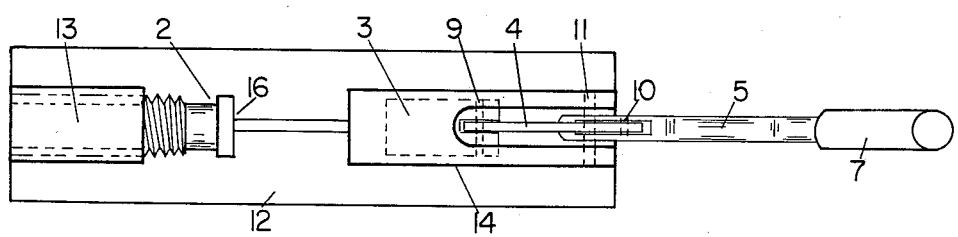

Referring to FIG. 1, the preferred embodiment of the invention is made up of a body (12) (which continuously forms not only a base (1), but also the anvil cover (13) and the piston cover (14)), an anvil screw (2), a piston (3) connected to a toggle link (4), and a handle lever (5).

The following materials and dimensions are not intended to be limiting, but rather have been used for a prototype of the present invention and have proven to successfully accomplish the aforementioned objects.

In the preferred embodiment as illustrated, the body (12) is made of aluminum alloy and finished with sulfuric anodize to free the exterior surface of tool or handling marks. It is 8 inches in length with an anvil screw (2) a length of $2\frac{1}{4}$ inches and a piston (3) a length of $1\frac{1}{2}$ inches. The diameter of the recess formed in both the anvil face (16) and the piston face (17) is 0.65 of an inch and is designed to receive opposite ends of the nut. The recess at its deepest point forms a 90 degree angle.

The function of the parts of the invention will become clear in the following description of the step-by-step operation of the device.

Beginning at FIG. III, the first step in the operation of the nutcracker is illustrated. The lever handle (5) is in the "up" position, retracting the piston (3) into its cover (14). As illustrated in FIG. II, the handle is then closed to the point where the index mark (15) of the piston (3) lines up with the outer edge of the piston cover (14). At this point, a nut is inserted against the piston face (17) and the anvil screw (2) is adjusted so that the other end of the nut is firmly held in the anvil face (16).

Finally the lever handle (5) is moved downward to its resting position. This causes the toggle joint formed by the toggle link (4), the lever handle (5), and the three pivot points (9, 10, 11) to slide the piston (3) into the nut a short distance, cracking the nutshell (18) without damaging the meat inside. A safety feature of the present invention is that the user cannot get his fingers caught under the toggle joint, because it is contained within the piston cover (14).

The index mark (15) is critical to the present invention and creates a substantial improvement over the prior art. The index mark aids the user in applying the optimum cracking force by cracking the nut at a point where the cracking pressure is built up as pivot point (10) moves at an approximately 45 degree angle from its initial setup point to its resting point in a straight line with the other pivot points (9, 11), at which time the travel of the piston stops. Thus, the user need not guess when the nut is sufficiently cracked as was required in the prior art and therefore over-cracking is avoided.

As illustrated, the piston travel is limited to 3/16 inch. As will be obvious to one skilled in the art, any other method of translating the pivotal motion of the handle into a sliding motion of the piston, such as an eccentric or cam, or a simple lever action with a stop to limit travel, may be substituted for the toggle joint.

The handle design illustrated allows the maximum force to be applied in a downward direction. The lever handle (5) is fastened securely to the piston cover (14) by pivot pin (6) and is stabilized on that pin between two spacers (11). Thus, the nutcracker has no tendency, common in the prior art, to "walk" along the table. Also, the maximum force in cracking the nut is applied in such a way that the user can press his weight into the handle, making the operation easier. Other handle designs can be used without departing from the teachings of the invention.

Other features may be added to the present invention, but are not integral to its functioning. Pads (8) may be added to the bottom of the base (1) of the invention to avoid scratching the surface upon which it is used, as well as to stabilize it during use. A handle grip (7) may also be included for appearance, as well as for comfort and ease in use.

Accordingly, it is to be understood that the embodiment of the invention herein described is merely illustrative of the application of the principles of the invention. Reference herein to details of the illustrated embodiment are not intended to limit the scope of the claims, which themselves recite those features regarded as essential to the invention.

I claim:

1. A nutcracker, comprising:
   a. base means for holding the moving parts of said nutcracker;
   b. anvil cover means, located at one end of said base means, and having internal threads;
   c. anvil screw means having a face at one extremity and screw threads at the other extremity for rotatable adjustment within said anvil cover means, said screw threads move said anvil screw means in the direction of one dimension of said base means;
   d. piston cover means, located at the opposite end of said base means from said anvil cover means, and aligned with said anvil cover means and said anvil means;
   e. movable piston means having a face at one extremity opposing said anvil face, slidably inserted into said piston cover means for moving toward and away from said opposing anvil means;
   f. handle force amplifying means for translating the pivotal motion of a handle into the slidable motion of the piston, located at the opposite end of said piston means from said piston face, for moving said piston toward and away from said anvil means;
   g. said force amplifying means translates the pivotal motion of said handle into the slidable motion of said piston and maximum cracking force is delivered via said piston as said piston reaches the end of its travel toward said opposing anvil;
   h. measuring means cooperating with said piston means for determining an optimum cracking distance for said piston to move away from and toward said rotatable anvil overcracking of the nut to be cracked;
   i. said nutcracker functioning by having the user set the optimum cracking distance with the measuring means and adjusting said rotatable anvil toward said piston to firmly hold a nut to be cracked therebetween, then moving said piston the optimum cracking distance by activating said force amplifying means.

2. The nutcracker of claim 1, wherein said measuring means for determining the optimum cracking distance is an index mark on said piston means at the extremity closest to said piston face, which the user lines up with the outer edge of said piston cover closest to said anvil cover, such that said piston moves only the optimum cracking distance when said handle force amplifying means is activated, thus preventing the overcracking of the nut to be cracked.

3. A nutcracker, comprising:
   a. base means for holding the moving parts of said nutcracker;
   b. anvil cover means, located at one end of said base means, and having internal threads;
   c. anvil screw means having a face at one extremity and screw threads at the other extremity for rotatable adjustment within said anvil cover means, said screw threads move said anvil screw means in the direction of one dimension of said base means;
   d. piston cover means, located at the opposite end of said base means from said anvil cover means, and aligned with said anvil cover means and said anvil means;
   e. movable piston means having a face at one extremity opposing said anvil face, slidably inserted into said piston cover means for moving toward and away from said opposing anvil means;
   f. toggle joint means for moving said piston toward and away from said anvil means;
   g. said toggle joint means having a toggle link, a lever handle, part of which comprises another toggle link, and three pivot points;
   h. said toggle joint means translates the motion of said lever handle into the slidable motion of said piston and maximum cracking force is delivered via said piston as said piston reaches the end of its travel toward said opposing anvil, at which point said toggle link and said toggle pivot points are lined up in a straight line in the direction of the movement of the piston,
   i. measuring means cooperating with said piston means for determining an optimum cracking distance for said piston to move away from and toward said rotatable anvil to avoid overcracking of the nut to be cracked;
   j. said nutcracker functioning by having the user set the optimum cracking distance with the measuring means and adjusting said rotatable anvil toward said piston to firmly hold a nut to be cracked therebetween, then moving said piston the optimum cracking distance by activating said toggle joint means.

4. The nutcracker of claim 3, wherein said measuring means for determining the optimum cracking distance is an index mark on said piston means at the extremity closest to said piston face, which the user lines up with the outer edge of said piston cover closest to said anvil cover, such that said piston moves only the optimum cracking distance when said toggle joint means is activated, thus preventing the overcracking of the nut to be cracked.

5. The nutcracker of claim 4 wherein said toggle joint means is located within said piston cover to prevent the user from being injured therefrom.

6. The nutcracker of claim 5 wherein said anvil face and said piston face are concave.

* * * * *